United States Patent [19]

Weaver et al.

[11] 3,878,190
[45] Apr. 15, 1975

[54] THIADIAZOLYL-AZO-α-NAPHTHYLAMINE COMPOUNDS

[75] Inventors: Max Allen Weaver; Herman Speight Pridgen, both of Kingsport, Tenn.

[73] Assignee: Eastman Kodak Company, Rochester, N.Y.

[22] Filed: July 2, 1973

[21] Appl. No.: 376,049

[52] U.S. Cl............ 260/158; 8/41 B; 260/326.5 C; 260/326.5 L
[51] Int. Cl...... C09b 29/06; D06p 1/18; D06p 3/26
[58] Field of Search..................................... 260/158

[56] References Cited
UNITED STATES PATENTS

| | | | |
|---|---|---|---|
| 3,084,153 | 4/1963 | Fishwick et al. | 260/158 |
| 3,631,020 | 12/1971 | Weaver et al. | 260/158 |

*Primary Examiner*—Floyd D. Higel
*Assistant Examiner*—C. F. Warren

[57] ABSTRACT

Monoazo compounds consisting of a 1,3,4-thiadiazolyl diazo nucleus and an α-naphthylamine coupling nucleus are particularly useful for dyeing carpets of nylon fibers on which the compounds produce red to violet shades.

3 Claims, No Drawings

THIADIAZOLYL-AZO-α-NAPHTHYLAMINE COMPOUNDS

This invention relates to certain novel azo compounds useful for dyeing polyamide fibers and, more particularly, it relates to 1,3,4-thiadiazolyl-azo-naphthylamine compounds and to polyamide fibers dyed therewith.

Our novel azo compounds have the general formula (I) 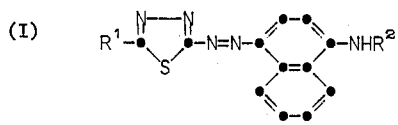

wherein $R^1$ is hydrogen; alkyl of one to about eight carbon atoms; lower alkylthio substituted with hydroxy, lower alkanoyloxy, succinimido, 2-pyrrolidinono, lower alkanoylamido, lower alkoxy, cycloalkyl or aryl; cyclohexylthio; lower alkylcyclohexylthio; lower alkanoylamido, chlorine, bromine; or aryl; and $R^2$ is hydrogen; alkyl of one to about eight carbon atoms; lower alkyl substituted with formamido, lower alkanoylamido, 2-pyrrolidinono, lower alkoxy, hydroxy, hydroxy-lower-alkoxy, carbamoyl, lower alkylcarbamoyl, aryloxy, aryl, cyclohexyl, lower alkanoyloxy, lower alkoxycarbonyl, succinimido, phthalimidino, lower alkylsulfonamido, lower alkylthio, arylthio, or lower alkoxycarbonylamido; aryl; cyclohexyl; cyclohexyl substituted with lower alkyl; or furfuryl;

in which each aryl moiety is phenyl or phenyl substituted with lower alkyl, lower alkoxy, chlorine or bromine.

The compounds of our invention are prepared by diazotizing an aminothiadiazole having the formula

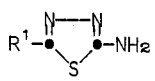

and coupling the resulting diazonium salt with an α-naphthylamine having the formula

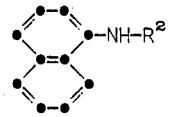

according to conventional procedures. The amino-thiadiazoles are obtained by published procedures or techniques analogous thereto. The α-naphthylamines are prepared by the alkylation of α-naphthylamines, by the reductive alkylation of 1-nitronaphthalene with aldehydes and ketones or by reacting primary amines with α-naphthols according to the Bucherer reaction.

Our novel azo compounds produce red to violet shades on nylon fibers. The compounds are particularly suitable for dyeing carpets of nylon fibers on which the compounds exhibit good to excellent fastness to light, gas, ozone, sublimation and crocking. The compounds also exhibit good dyeability and migration properties. This unique combination of properties distinguishes our novel compounds from the compound 4-(5-phenyl-1,3,4-thiadiazol-2-ylazo)-1-amino-5-naphthol.

As used herein to describe an alkyl moiety of a group represented by $R^1$ or $R^2$, "lower" designates a carbon content of one to about four carbon atoms. Preferred aryl moieties of the aryl-moiety containing groups included in the above definitions of $R^1$ and $R^2$ are tolyl, anisyl, ethoxyphenyl and chlorophenyl. The substituted alkylthio groups which $R^1$ can represent preferably are cyclohexylmethylthio, benzylthio, phenethylthio or a group having the formula $—S—X—R^3$ in which X is ethylene, propylene, trimethylene, or tetramethylene and $R^3$ is hydroxy, lower alkanoyloxy, succinimido, lower alkanoylamido, or lower alkoxy. Preferred substituted alkyl groups represented by $R^2$ are benzyl, phenethyl, cyclohexylmethyl, carbamoylethyl, lower alkylcarbamoylethyl or a group having the formula $—X—R^4$ in which X is ethylene, propylene, trimethylene or tetramethylene and $R^4$ is hydroxy, lower alkoxy, lower hydroxyalkoxy, formamido, lower alkanoylamido, 2-pyrrolidinono, phthalimidino, lower alkoxycarbonylamido, lower alkylsulfonamido, succinimido, lower alkanoyloxy, lower alkoxycarbonyl, aryloxy, lower alkylthio, or arylthio.

A group of our novel compounds which are especially preferred because of their cost:performance ratio are those of Formula (I) in which $R^1$ is hydrogen, lower alkyl or lower alkylthio and $R^2$ is cyclohexyl, lower alkyl, carbamoylethyl or a group having the formula $—X—R^4$ in which X is ethylene, propylene or trimethylene and $R^4$ is hydroxy, formamido, lower alkanoylamido, lower alkylsulfonamido or lower alkoxy.

Our novel azo compounds and their synthesis and use are further illustrated by the following examples.

EXAMPLE 1

A mixture of 1-naphthol (28.8 g.), N-(2-aminoethyl)-2-pyrrolidinone (76.8 g.), sodium bisulfite (20.8 g.), and water (170 ml.) is heated in an autoclave at 155°C. for 12 hours. The solid thus produced is collected by filtration and recrystallized from ethanol. The yield is 37.4 g. of N-[2-(2-pyrrolidinono)ethyl]-1-naphthylamine, a white solid which melts at 137°–139°C.

Anal. Calcd. for $C_{16}H_{18}N_2O$: C, 75.7; H, 7.2; N, 11.0. Found: C, 75.7; H, 7.2; N, 11.0.

EXAMPLES 2–11

Sodium nitrite is added gradually to 25 ml. concd. $H_2SO_4$. The solution is cooled and 50 ml. 1:5 acid (1 part propionic:5 parts acetic acid) is added below 25°C. This mixture is then cooled and 2-amino-5-ethylthio-1,3,4-thiadiazole (8.0 g. .05 mole) is added, followed by 50 ml. 1:5 acid, all below 5°C. The diazotization mixture is stirred at 0°–5°C. for 2 hours. A 0.005 mole portion of each of the couplers:

N-Ethyl-1-naphthylamine (Example 2)
N-Cyclohexyl-1-naphthylamine (Example 3)
N-(2-Acetamidoethyl)-1-naphthylamine (Example 4)
N-[2-(2-Pyrrolidinono)ethyl]-1-naphthylamine (Example 5)
N-(3-Methoxypropyl)-1-naphthylamine (Example 6)
N-Phenyl-1-naphthylamine (Example 7)
N-(2-Hydroxyethyl)-1-naphthylamine (Example 8)
N-[2-(2-Hydroxyethoxy)ethyl]-1-naphthylamine (Example 9)
N-(2-Carboxamidoethyl)-1-naphthylamine (Example 10)

N-(sec. Butyl)-1-naphthylamine (Example 11) is dissolved in 30-40 ml. of 1:5 acid. This solution is chilled in an ice bath and 0.005 mole portion of the above diazonium salt solution is added gradually with stirring. The coupling mixtures are kept at 10°-20°C. and buffered by the addition of ammonium acetate. After allowing the coupling mixture to stand for 1 hour, with occasional stirring, they are diluted with water to precipitate the azo products. The products are collected by filtration, washed with water, dried in air, and reslurried in hot methanol. The azo compounds obtained produce fast violet shades on nylon carpet.

The azo compounds set forth in the examples of the following Table conform to Formula (I) and are prepared according to the procedures described hereinabove. The color given for each of the azo compounds set forth in the Table refers to the shade it produces on nylon fibers. Examples 2 through 12 of the Table give the structures of the azo compounds prepared in the examples set forth above.

TABLE

| Example No. | $R^1$ | $R^2$ | Color |
|---|---|---|---|
| 2 | $C_2H_5S-$ | $-C_2H_5$ | Violet |
| 3 | $C_2H_5S-$ | $-C_6H_{11}$ | Violet |
| 4 | $C_2H_5S-$ | $-CH_2CH_2NHCOCH_3$ | Violet |
| 5 | $C_2H_5S-$ | $-CH_2CH_2\overline{N(CH_2)_3CO}$ | Violet |
| 6 | $C_2H_5S-$ | $-(CH_2)_3OCH_3$ | Violet |
| 7 | $C_2H_5S-$ | $-C_6H_5$ | Violet |
| 8 | $C_2H_5S-$ | $-CH_2CH_2OH$ | Violet |
| 9 | $C_2H_5S-$ | $-CH_2CH_2OCH_2CH_2OH$ | Violet |
| 10 | $C_2H_5S-$ | $-CH_2CH_2CONH_2$ | Violet |
| 11 | $C_2H_5S-$ | $-CH(CH_3)C_2H_5$ | Violet |
| 12 | $C_2H_5S-$ | $-CH_2CH_2OCH_2CH_2OCH_3$ | Violet |
| 13 | $C_2H_5S-$ | $-CH_2CH_2OC_6H_5$ | Violet |
| 14 | $C_2H_5S-$ | $-CH_2CH_2C_6H_5$ | Violet |
| 15 | $C_2H_5S-$ | $-CH_2C_6H_5$ | Violet |
| 16 | $C_2H_5S-$ | $-CH_2C_6H_4-p-OCH_3$ | Violet |
| 17 | $C_2H_5S-$ | $-CH_2C_6H_4-p-CH_3$ | Violet |
| 18 | $C_2H_5S-$ | $-CH_2C_6H_{11}$ | Violet |
| 19 | $C_2H_5S-$ | $-CH_2CH_2CONHCH(CH_3)$ | Violet |
| 20 | $C_2H_5S-$ | $-CH_2CH_2COOC_2H_5$ | Violet |
| 21 | $C_2H_5S-$ | $-CH_2CH(OH)CH_2OH$ | Violet |
| 22 | $C_2H_5S-$ | $-CH_2CH(OH)CH_3$ | Violet |
| 23 | $C_2H_5S-$ | $-CH_2CH(OH)CH_2OCH_3$ | Violet |
| 24 | $C_2H_5S-$ | $-CH_2\overline{C=CHCH=CH}O$ | Violet |
| 25 | $CH_3S-$ | $-CH_2CH_2NHCOCH_3$ | Violet |
| 26 | $CH_3S-$ | $-C_2H_5$ | Violet |
| 27 | $CH_3S-$ | $-CH(CH_3)C_2H_5$ | Violet |
| 28 | $CH_3S-$ | $-CH_2CH_2\overline{NCOCH_2CH_2CO}$ | Violet |
| 29 | $CH_3S-$ | $-(CH_2)_3OCH(CH_3)_2$ | Violet |
| 30 | $CH_3S-$ | $-(CH_2)_3OCH_2CH_2OCH_3$ | Violet |
| 31 | $CH_3S-$ | $-(CH_2)_3OC_6H_5$ | Violet |
| 32 | $CH_3S-$ | $-(CH_2)_3NHCOH$ | Violet |

TABLE—Continued

| Example No. | R¹ | R² | Color |
|---|---|---|---|
| 33 | CH₃S— | —(CH₂)₃NHSO₂CH₃ | Violet |
| 34 | CH₃S— | —(CH₂)₃SCH₃ | Violet |
| 35 | CH₃S— | —(CH₂)₃SC₆H₅ | Violet |
| 36 | HOCH₂CH₂S— | —C₂H₅ | Violet |
| 37 | CH₃CONHCH₂CH₂S— | —C₂H₅ | Violet |
| 38 | OCCH₂CH₂CONCH₂CH₂S— | —(CH₂)₃OCH₃ | Violet |
| 39 | OC(CH₂)₃NCH₂CH₂S— | —(CH₂)₃OCH₃ | Violet |
| 40 | CH₃OCH₂CH₂S— | —(CH₂)₃OCH₃ | Violet |
| 41 | C₆H₅S— | —(CH₂)₃OCH₃ | Violet |
| 42 | C₆H₁₁S— | —(CH₂)₃OCH₃ | Violet |
| 43 | p-CH₃C₆H₄CH₂S— | —(CH₂)₃OC₂H₅ | Violet |
| 44 | C₆H₅CH₂S— | —CH₂CH₂OCH₂CH₂OH | Violet |
| 45 | C₆H₁₁S— | —(CH₂)₃OCH(CH₃)₂ | Violet |
| 46 | C₆H₁₁S— | —CH₂CH₂OCH₂CH₂OH | Violet |
| 47 | CH₃COOCH₂CH₂S— | —C₂H₅ | Violet |
| 48 | —CH₃ | —C₂H₅ | Violet |
| 49 | —CH₃ | —CH₂CH₂NHCOCH₃ | Red |
| 50 | —C₂H₅ | —CH₂CH₂OCH₂CH₂OCH₃ | Red |
| 51 | —CH(CH₃)₂ | —CH₂CH₂NHCOC₂H₅ | Red |
| 52 | —(CH₂)₅CH₃ | —CH₂CH₂CONH₂ | Red |
| 53 | —CH₂CH(C₂H₅)(CH₂)₃CH₃ | —CH₂CH₂CONH₂ | Red |
| 54 | —CH₂C₆H₅ | —CH₂CH₂CONH₂ | Red |
| 55 | —C₆H₁₁ | —C₂H₅ | Red |
| 56 | —C₆H₁₁ | —C₆H₁₁ | Red |
| 57 | —C₆H₅ | —C₂H₅ | Violet |
| 58 | —C₆H₄—p-OCH₃ | —C₂H₅ | Violet |
| 59 | —C₆H₄—p-CH₃ | —CH₂CH₂OCH₃ | Violet |
| 60 | —C₆H₄—p-Cl | —C₂H₅ | Violet |
| 61 | —C₆H₅ | —(CH₂)₃—NHCOCH₃ | Violet |
| 62 | —Cl | —C₂H₅ | Violet |
| 63 | —Br | —C₂H₅ | Violet |
| 64 | —SCH₂CH(OH)CH₂OH | —C₂H₅ | Violet |
| 65 | —SC₂H₅ | —CH₂CH₂NCO—O—C₆H₅CH₂ | Violet |
| 66 | —SC₂H₅ | —CH₂CH(C₂H₅)(CH₂)₃CH₃ | Violet |
| 67 | —SC₂H₅ | —CH₂CH₂NHCOCH₂OH | Violet |
| 68 | —SC₂H₅ | —CH₂CH₂NHCOCH₂Cl | Violet |
| 69 | —SC₂H₅ | —CH₂CH₂CN | Red |
| 70 | —SC₂H₅ | —CH₂CH(CH₃)₂ | Violet |

The novel azo compounds can be applied to polyamide textile materials according to known disperse dyeing techniques. Various dispersing and wetting agents can be employed in the dispersion of the finely divided dye compound in an essentially aqueous dyebath. Procedures by which the compounds of the invention can be applied to polyamide textile materials are described in U.S. Pat. Nos. 3,100,134 and 3,320,021. The following example illustrates a method for applying the novel compounds to polyamide fibers.

EXAMPLE 71

The azo compound (16.7 mg.) of Example 2 is dispersed in 10 cc. of 2-methoxyethanol. A small amount (3–5 cc.) of a 3 percent sodium lignin sulfonate solution is added, with stirring, and then the volume of the bath is brought to 150 cc. with water. A 5 g. textile fabric made of nylon 66 fibers is placed in the bath and worked 10 minutes without heat. The bath is then slowly brought to the boil over a 30-minute period and the dyeing is carried out at the boil for 1 hour. The dyed fabric is then removed from the dyebath, rinsed with water and dried in an oven at 250°F. The fabric is dyed a bright shade of violet exhibiting excellent fastness properties when tested in accordance with the procedures described in the Technical Manual of the American Association of Textile Chemists and Colorists, 1968 edition.

The polyamide materials which can be dyed with the novel azo compounds are well known and include nylon 66 (polyhexamethylene adipamide) manufactured by the polymerization of adipic acid and hexamethylenediamine, nylon 6 (polycaprolactum) prepared from epsilon-aminocaproic acid lactum (caprolactum) and nylon 8. A detailed description of the synthetic polyamide materials which are dyed bright fast shades by the compounds of the invention is set forth in U.S. Pat. No. 3,100,134.

The invention has been described in detail with particular reference to preferred embodiments thereof, but it will be understood that variations and modifications can be effected within the spirit and scope of the invention.

We claim:

1. A compound having the formula

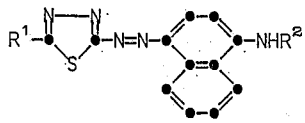

wherein $R^1$ is hydrogen; alkyl of one to eight carbon atoms; lower alkylthio substituted with hydroxy, lower alkanoyloxy, succinimido, 2-pyrrolidinono, lower alkanoylamido, lower alkoxy, cyclohexyl, phenyl, or phenyl substituted with lower alkyl, lower alkoxy, chlorine or bromine; cyclohexylthio; lower alkylcyclohexylthio; lower alkanoylamido; chlorine; bromine; or aryl; and $R^2$ is hydrogen; alkyl of one to eight carbon atoms; lower alkyl substituted with formamido, lower alkanoylamido, 2-pyrrolidinono, lower alkoxy, hydroxy, hydroxy-lower-alkoxy, carbamoyl, lower alkylcarbamoyl, aryloxy, aryl, cyclohexyl, lower alkanoyloxy, lower alkoxycarbonyl, succinimido, phthalimidino, lower alkylsulfonamido, lower alkylthio, arylthio, or lower alkoxycarbonylamido; aryl; cyclohexyl; cyclohexyl substituted with lower alkyl; or furfuryl; in which each aryl moiety is phenyl or phenyl substituted with lower alkyl, lower alkoxy, chlorine or bromine.

2. A compound according to claim 1 wherein
$R^1$ is hydrogen; alkyl of one to eight carbon atoms; cyclohexylmethylthio; benzylthio; phenethylthio; cyclohexylthio; lower alkylcyclohexylthio; lower alkanoylamido; chlorine; bromine; aryl; or a group having the formula —S—X—$R^3$ in which X is ethylene, straight or branch chain trimethylene or tetramethylene and $R^3$ is hydroxy, lower alkanoyloxy, succinimido, lower alkanoylamido, or lower alkoxy; and $R^2$ is hydrogen; alkyl of one to eight carbon atoms; benzyl; phenethyl; cyclohexylmethyl; carbamoylethyl; lower alkylcarbamoylethyl; a group having the formula —X—$R^4$ in which X is ethylene, straight or branch chain trimethylene or tetramethylene and $R^4$ is hydroxy, lower alkoxy, lower hydroxyalkoxy, formamido, lower alkanoylamido, 2-pyrrolidinono, lower alkoxycarbonylamido, lower alkylsulfonamido, succinimido, phthalimidino, lower alkanoyloxy, lower alkoxycarbonyl, aryloxy, lower alkylthio or arylthio; aryl; cyclohexyl; cyclohexyl substituted with lower alkyl; or furfuryl.

3. A compound according to claim 1 wherein $R^1$ is hydrogen, lower alkyl or lower alkylthio; and $R^2$ is cyclohexyl, lower alkyl; carbamoylethyl, or a group having the formula —X—$R^4$ in which X is ethylene, or straight or branch chain trimethylene and $R^4$ is hydroxy, formamido, lower alkanoylamido, lower alkylsulfonamido or lower alkoxy.

* * * * *